C. E. FALOR.
INFLATING TUBE PROTECTOR.
APPLICATION FILED OCT. 31, 1911.
1,036,085.
Patented Aug. 20, 1912.
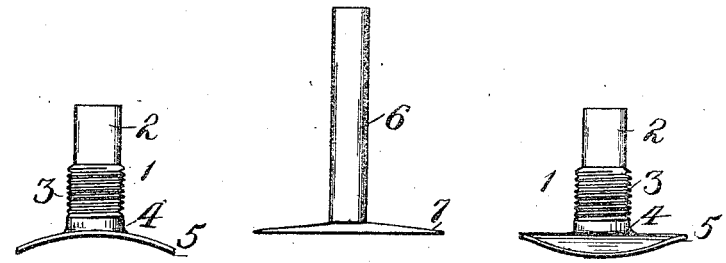
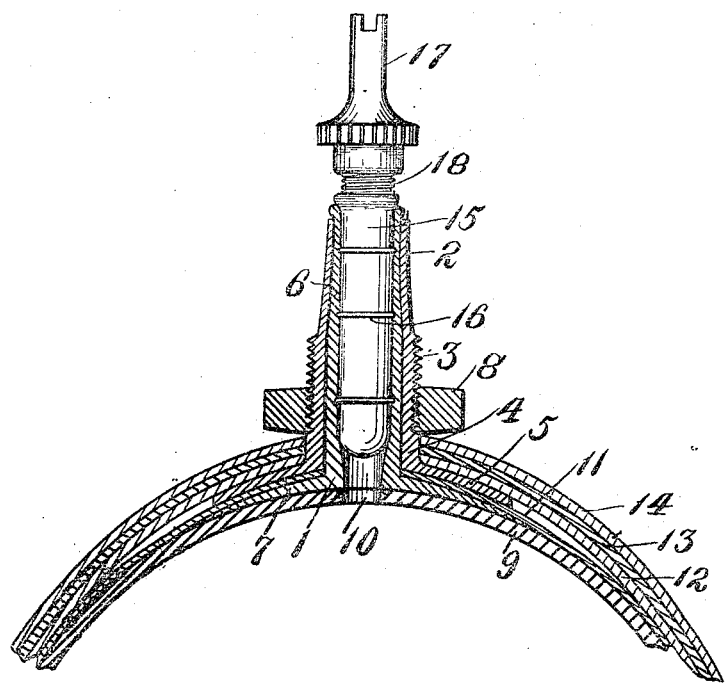

UNITED STATES PATENT OFFICE.

CLARENCE E. FALOR, OF AKRON, OHIO, ASSIGNOR TO THE GOODYEAR TIRE AND RUBBER COMPANY, OF AKRON, OHIO, A CORPORATION OF OHIO.

INFLATING-TUBE PROTECTOR.

1,036,085.

Specification of Letters Patent.

Patented Aug. 20, 1912.

Application filed October 31, 1911. Serial No. 657,850.

*To all whom it may concern:*

Be it known that I, CLARENCE E. FALOR, a citizen of the United States, residing at Akron, in the county of Summit and State of Ohio, have invented new and useful Improvements in Inflating-Tube Protectors, of which the following is a specification.

This invention relates to a device for protecting the tube used for conducting an inflating fluid to an inflatable body such as a pneumatic tire.

As now constructed, pneumatic tires are provided with a short rubber inflating-tube for conducting the inflating fluid to the interior of the tire, and which is usually passed through an aperture in the rim on which the tire is mounted, which makes it easily torn from the tire when said tire shifts its position on the rim for any reason.

The object of this invention therefore, is to provide a suitable device of rigid material which can be connected with the tire to receive the inflating tube and project through the aperture in the rim which will prevent the shifting of the tire and the consequent tearing or destruction of the inflating-tube.

A further object is to so construct the device that it does not in any way impair the tire or render its construction in the ordinary way difficult and which when mounted in connection with the tire rim will project through the aperture therein to receive a clamping nut for clamping the tire securely to the rim.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures, Figures 1 and 2, are views in side elevation of my improved inflating-tube protector; Fig. 3, is a view of an ordinary inflating-tube detached from a tire; and, Fig. 4, is a transverse sectional view of so much of a tire as will illustrate the application of this invention to a tire, showing the same in operative connection with the inflating-tube.

Referring to the drawings the reference numeral 1 denotes generally the inflating-tube protector which consists of a tubular stem the upper end 2 of which is of comparatively thin malleable material, preferably metal, below which and integral therewith is a thicker portion 3 provided with exterior threads of comparatively fine mesh. Below the threaded portion 3 is a hub 4 terminating at its lower end in an elliptical thin flange 5, which is bent or curved as shown in the drawings with a curvature approximately the curvature of the tire with which it is to be used. The bore or interior diameter of the protector is sufficiently large to receive the tubular portion 6 of an inflating-tube and which is customarily provided at its lower end with a radial flange 7 preferably tapering to a thin fine edge. The threaded portion 3 is of sufficient length to extend through the various plies of material of which the tire-wall is composed and also to extend through the rim a sufficient distance to receive a nut 8 which travels thereon for clamping.

In assembling the tire in connection with my improved protector the tire is set up somewhat as follows, attention being especially directed to Fig. 4 in which the reference numeral 9 denotes the inner air-containing tube of the tire which is provided with an opening 10. The inflating-tube 6 is positioned on the tire so that the opening in the tube 6 registers with the opening 10 and the flange 7 surrounds the opening and is cemented to the tube 9. The inner tube 9 is then inclosed in a wear-resisting layer of suitable material 11 which is provided with an opening through which the tube 6 projects. The protector 1 is then slipped over the tube 6 with its flanged lower end 3 shaped to coincide with the curvature of the tire and with its threaded end projecting outwardly. The tire is then built up of a plurality of layers of suitable material 12, 13, and 14, and more, if necessary, sufficient layers being employed to secure the desired strength in the tire. As before stated the exterior diameter of the inflating tube 6 is approximately the same as the interior diameter of the protector 1 so as to leave little or no space between the two as is clearly shown in Fig. 4, and it will be noted that the flanged portion 5 of the protecting member 1 is securely anchored within the wall of the tire and held there by the strength-giving plies of material 12, 13 and 14 so as to thereby unite the protector firmly with the tire-body. The next step in assembling is to insert in the open end of the tube 6 which customarily projects beyond the open end of the member 1 the shank end 15 of a valve-stem which is usually of a sufficient diameter to distort the rubber of the tube 6 and crowd it against the inner wall of the member 1 with considerable force. This stem is usually provided with a plurality of circumferential ribs 16 for more securely anchoring the shank end 15 in place, after which the portion 2 of the protecting member 1 which is made of malleable material is pinched or squeezed inwardly, or otherwise contracted so as to compress the rubber tube 6 firmly against the shank end 15 of the valve-stem. The tire is then mounted on a wheel rim with the protecting member 1 projecting through the usual aperture in the rim provided for this purpose. The nut 8 is then applied and rotated so as to draw the tire firmly against the rim and hold the same against shifting. The usual cap 17 is then applied to the outer threaded end 18 of the valve-stem and the device is ready for use.

It will be noted that by embedding the flanged end 5 of the protecting member 1 within the wall of the tire and passing the stem portion of the protector through the opening, shifting of the tire is prevented and consequently the danger of a shearing action between the rim and the tire, tending to cut, tear, or injure the comparatively delicate inflating tube 6 is entirely eliminated.

I claim:—

1. A device for preventing circumferential creeping of tires on wheel rims and protecting the inflating tubes thereof from injury due to such creeping, comprising a tubular member of greater rigidity than the inflating tube positioned around said tube, the intermediate portion of said member where it extends in a wheel rim exteriorly threaded to receive a clamping-nut for connecting it to said rim, one end of said member provided with a disk-shaped lateral flange arranged in the wall of the tire, the opposite end of said member arranged to be collapsed against said inflating tube when a valve-casing is positioned therein for holding the latter against displacement.

2. The combination with an inflating-tube embodying an inner air-retaining wall provided with a yieldable, projecting, inflating tube, said inner wall surrounded by an inclosing, built-up, strength-giving envelop, of a tubular member inclosing said inflating-tube and provided at one end with a disk-like flange positioned in said envelop, the intermediate portion which extends in the wheel rim exteriorly threaded to receive a clamping-nut, the opposite end of said member arranged to be compressed against said inflating tube when a valve-casing is positioned therein, thereby anchoring the valve securely in position.

In testimony whereof I have hereunto set my hand in presence of two subscribing witnesses.

CLARENCE E. FALOR.

Witnesses:
R. M. LEMIEUX,
OTTO W. MYERS.